United States Patent [19]

Boos et al.

[11] Patent Number: 5,693,362
[45] Date of Patent: Dec. 2, 1997

[54] PROCESS AND APPARATUS FOR MOVING AND TREATING A PARTICULATE MATERIAL

[75] Inventors: Gunther Boos, Bad Sackingen, Germany; Winfried Doetsch, Pratteln; Lutz Donnerhack, Basel, both of Switzerland; Wolfgang Hungerbach, Mullheim; Matthias Tondar, Hausen i.W., both of Germany

[73] Assignee: Glatt Maschinen-und Apparatebau AG, Pratteln, Switzerland

[21] Appl. No.: 512,316

[22] Filed: Aug. 8, 1995

[30] Foreign Application Priority Data

Aug. 11, 1994 [CH] Switzerland .............. 2482/94

[51] Int. Cl.$^6$ ...................................... B05D 5/00
[52] U.S. Cl. ............... 427/10; 427/213; 118/712; 118/303; 118/309; 118/DIG. 5; 34/494; 34/82
[58] Field of Search .................... 118/303, 712, 118/309, 62, 63, 64, DIG. 5; 34/360, 372, 443, 481, 482, 487, 498, 572, 210, 218, 82, 227, 494; 427/421, 8, 9, 10

[56] References Cited

U.S. PATENT DOCUMENTS 3,570,716  3/1971  Kisanoff .................. 222/67
4,323,312  4/1982  Glatt et al. ............... 366/120
4,535,006  8/1985  Naunapper et al. .......... 118/694

FOREIGN PATENT DOCUMENTS 1476283   4/1989  U.S.S.R. .
93/25303  12/1993  WIPO .

Primary Examiner—Donald E. Czaja
Assistant Examiner—Calvin Padgett
Attorney, Agent, or Firm—Jacobson, Price, Holman & Stern, PLLC

[57] ABSTRACT

The apparatus has a container which contains a first filter. During operation, this separates the first interior region containing particulate material from a second interior region. The latter is connected to a downstream dust separator. This has a housing which contains a second filter. The apparatus furthermore has a fan, at least one dust concentration sensor and a control device connected to this and to the fan. During fluidization and treatment of the particulate material in the first interior region of the container, the dust concentration in the oxygen-containing gas flowing from the first filter to the second filter and usually consisting of air is measured. If the dust concentration is at least equal to a predetermined limit below the lower explosion limit, the control device switches off the fan. This makes it possible to keep the pressures generated by any dust explosion relatively small.

10 Claims, 1 Drawing Sheet

PROCESS AND APPARATUS FOR MOVING AND TREATING A PARTICULATE MATERIAL

BACKGROUND OF THE INVENTION

1. Field of the Invention

The invention relates to a process and an apparatus for moving, in particular fluidizing, a particulate material.

The particulate material may be treated, for example dried, during movement. However, during movement, the particles of the material may first be agglomerated by spraying with at least one spray material and granulated by pelletization and/or provided with coats and then dried without being sprayed.

The process and the apparatus serve in particular for moving a particulate material which contains flammable dust or during the movement and treatment of which flammable dust can form. Dust is understood here as meaning particulate material whose particles have diameters of at most about 0.5 mm and which, together with air, can form an explosive mixture. The process and the apparatus can be used, for example, for moving and treating a material consisting of dust. However, the process and the apparatus may also be used for moving and treating a material which consists of particles which are greater than 0.5 mm but from which explosive dust can form during movement as a result of abrasion. Furthermore, it is possible to spray a spray material consisting of dust or containing dust onto relatively large particles of a particulate material.

If air flows through the flammable dust, an explosive dust/air-gas mixture may form and may be caused to explode by ignition. There is a risk of explosion particularly when at least 50 percent by weight of the dust particles have a diameter of less than 0.07 mm and hence the median value of the particle diameter is less than 0.07 mm.

The terms "explosion-resistant", "resistant to explosion pressure" and "resistant to explosion pressure surges" will be explained here. Containers, pipes and other apparatus components which are designed to be explosion-resistant and in which explosions are likely to occur may be resistant to explosion pressure or resistant to explosion pressure surges. Apparatus components resistant to explosion pressure are designed in such a way that they withstand the pressure of an explosion without permanent deformation or other damage. In the case of apparatus components resistant to explosion pressure surges, on the other hand, permanent deformations are permissible. However, the apparatus components resistant to explosion pressure surges must not rupture. For further details, reference may be made to the VDI Guidelines 2263 and in particular to supplementary sheet 3 to these guidelines.

2. Description of the Prior Art

Known fluidized-bed apparatuses for moving and treating material which is at least partly dust-like have a material and/or fluidized-bed container which contains a perforated base in the lower part and, above said base, a first filter which separates a first, lower interior region (fluidized-bed chamber) present between said filter and perforated base from a second, upper interior region (pure air side of the first filter) of the container. The last-mentioned interior region is connected via connecting means having a connecting pipe to a housing of a downstream dust separator which contains another, second filter. The downstream dust separator has an outlet which is connected via a fan to the environment. The first filter usually has at least one holder and at least one washable filter fabric which is held by said holder and has tufts.

During operation of such an apparatus, the first filter ideally retains all dust present in the first, lower interior region of the container. If dust particles which are smaller than intended and smaller than the passage orifices of the first filter are formed during operation and/or if said filter is defective, dust can however under certain circumstances pass through the first filter. Such dust is then separated from the gas by the second filter belonging to the downstream dust separator.

In this context, it should be noted that the filter fabric of the first filter is usually removed temporarily from the container from time to time and is washed, and that there is a certain danger that tears will form in the filter fabric. This danger occurs in particular where a filter fabric is subjected to a number of wash processes which exceeds the maximum number of wash processes envisaged by the manufacturer of the filter and/or of the apparatus.

If a particulate material which consists at least partly of flammable dust, or during the fluidization and treatment of which such dust is formed, is fluidized with air in the lower interior region of the container, experience shows that explosive dust/air mixtures form therein. If such a mixture is accidentally ignited by an operational ignition source, an explosion occurs in the first, lower interior region. The resulting pressure surge is then also propagated into the second interior region of the container, which region is present above the first filter, into the pipe connecting said region to the downstream dust separator and into the downstream dust separator. In order to prevent material, flames and explosion pressure surges from entering the environment, a fast-acting shut-off device—for example in the form of a valve or slide valve—is arranged upstream of the air inlet of the material or fluidized-bed container and in the pipe between the downstream dust separator and the fan. In the case of an explosion, these shut-off devices are activated and closed by means of an optical or pressure-activated detector mounted at a suitable point.

Experimental investigations have shown that damage or tears present in the first filter (mesh size smaller than the expected particle diameter of the fine dust) before an explosion may result in the pressures generated during an explosion being substantially greater in the entire apparatus and therefore in particular in the first, lower interior region, in the second, upper interior region, in the connecting pipe and in the housing of the downstream dust separator, than the pressures which are generated during an explosion if the first filter is undamaged before the explosion. The material and/or fluidized bed container, the connecting means which connects said container to the downstream dust separator, the downstream dust separator and other parts of the apparatus which are subjected to pressure during an explosion must therefore be dimensioned and designed in such a way that they can withstand the pressures occurring during an explosion even when the first filter has allowed dust to pass through before an explosion. The known apparatuses therefore have the disadvantages that a possible passage of dust through the first filter increases the pressures generated during an explosion and the dangers and the production costs for an explosion-resistant embodiment of the apparatus. If the gas flowing from the first filter to the second filter during operation of the apparatus contains an amount of dust such that the gas and the dust together form an explosive mixture, an explosion may also be triggered under certain circumstances in the flow path extending from the first to the second filter.

In other known apparatuses, the material container contains, instead of a perforated base, a rotor which is adjustable in height and has a disc. During operation of such an apparatus, the rotor is brought into a position in which, together with an annular inner surface section of a part of the container, it bounds an annular gap through which air flows into the first, lower interior region of the container. A particulate material present in the first interior region is then moved partly by the rotating disc and partly by the air flowing through the annular gap into the first, lower interior region. During operation of such apparatuses, the problems which arise with respect to explosion resistance are similar to those encountered in the case of the apparatuses described above which have a perforated base.

Instead of air, it may be possible to pass another oxygen-containing gas through the container and the filter. In this case, problems similar to those encountered with the use of air may occur with regard to dust explosions.

SUMMARY OF THE INVENTION

It is the object of the present invention to avoid the disadvantages of the known processes and apparatuses. It is intended in particular to make it possible to keep as low as possible the pressures generated during any dust explosion and the production costs of an explosion-resistant apparatus, i.e. an apparatus which is resistant to explosion pressure or at least resistant to explosion pressure surges. Furthermore, it is intended to ensure that no explosion can be triggered in the oxygen-containing gas flowing from the first filter to the second filter.

This object is achieved according to one aspect of the invention by a process for moving, in particular fluidizing, a particulate material, in particular a material which contains flammable dust or during the movement of which flammable dust can form, by means of an apparatus which has a container, a first filter arranged therein, a downstream dust separator with a second filter and a fan, the first filter separating in the container a first interior region from a second interior region connected to the downstream dust separator, and the material being introduced into the first interior region and gas being transported by the fan through the first interior region and through the material present therein and the first filter into the second interior region, from there to the downstream dust separator and through the second filter, wherein the dust concentration in gas flowing from the first filter to the second filter is measured and the fan is automatically switched off if the dust concentration is at least equal to a limit.

According to a second aspect of the invention, there is provided an apparatus for moving, in particular fluidizing, a particulate material, in particular a material which contains flammable dust or during the movement of which flammable dust can form, having a container, a first filter which is arranged therein and separates a first interior region of the container, which region serves for receiving the material, from a second interior region of the container, a downstream dust separator which is connected to the second interior region and has a second filter and a fan which is controllable by a control device, for transporting gas through the first filter into the second interior region, from there to the downstream dust separator and through the second filter, wherein at least one dust concentration sensor for measuring the dust concentration in the gas flowing from the first filter to the second filter is present, wherein the or each dust concentration sensor is connected to the control device and wherein the latter has means for switching off the fan if the dust concentration is at least equal to a limit.

In the process according to the invention or during operation of the apparatus according to the invention, the gas passed through the container in order to move the particulate material usually consists of air. This can, for example, be sucked from the environment via an inlet air filter into the container and through the latter and through the downstream dust separator and released again to the environment via the fan. In the container and in the downstream dust separator, the air may have pressures which are, for example, approximately equal to the air pressure prevailing in the environment or smaller than this.

As already mentioned, in special cases another, oxygen-containing gas can be used instead of air for moving the particles, the oxygen content of such a gas preferably being not more than 21% by volume. The preceding and following information on dust/air mixtures are substantially applicable in an analogous manner also for mixtures of dust and other oxygen-containing gases.

The apparatus may furthermore form a closed circulation for the air or for the gas serving instead of air for moving the particulate material.

Dust/air mixtures are explosive only if the dust concentration, usually expressed in density units—for example in grams per cubic meter—or possibly in percent by volume, is within a certain range. This depends on the size and the diameter of the dust particles, on the material forming the dust, on the air density and possibly also to a small extent on the shapes and dimensions of the interior regions through which the dust/air mixture flows. As already mentioned, there is a great danger of explosion particularly when at least a part of the dust particles, for example half the dust particles or more, have a particle diameter of at most about 0.07 mm or even at most about 0.06 mm.

If the material—i.e. the chemical nature—of the dust, the particle diameters of the dust and the density of the air are specified, there is a particular danger of explosion when the dust concentration reaches or exceeds a critical value which is often defined technically as the lower explosion limit—abbreviated to LEL. Investigations with dusts comprising a large number of different materials having a median dust particle diameter of at most or less than 0.06 mm have shown that the lower explosion limit is in general 15 g/m$^3$ to 60 g/m$^3$. If necessary, the lower explosion limit of a certain dust can be determined experimentally by a defined method.

In the process according to the invention or during operation of the apparatus according to the invention, the dust concentration in the gas which flows from the first filter to the second filter and usually consists of air is measured and the fan is switched off if the dust concentration is at least equal to a predetermined limit, which is defined below also as the switch-off limit. This can be fixed so that the dust concentration in the air flowing from the first to the second filter or in the other gas is below the lower explosion limit.

This initially ensures that an explosion can never be triggered in the parts of the apparatus which bound the flow path of the air or of the other gas from the first filter to the second filter. It is nevertheless true that an explosion can be triggered in the first interior region of the container, which region contains the particulate material. In the case of such an explosion, at least the first filter is damaged, and the explosion pressure surge transports dust from the first interior region into a second interior region of the container and into the downstream dust separator. However, the investigations carried out have shown that the pressures generated by the explosion in the first interior region and especially in the second interior region, in connecting means which connect said regions with the downstream dust separator and in the downstream dust separator remain substantially smaller than when an explosive dust/air mixture is present in the interior regions extending from the first to the second filter already before the explosion, even in such a case—i.e. when dust passes from the first interior region into the second interior region of the container and possibly into the downstream dust separator during the explosion.

In many cases, the switch-off limit of the dust concentration can be fixed at not more than 30 g/m$^3$ and, for example, not more than 5 g/m$^3$ to not more than 20 g/m$^3$. If the lower explosion limit of a product to be processed is known to be, for example, LEL=30 g/m$^3$, the switch-off limit can be fixed, for example, at 5 g/m$^3$ to 20 g/m$^3$.

The container can be connected to the downstream dust separator by connecting means having at least one pipe. The said dust separator may have a housing which contains the second filter and an interior region which is adjacent to said filter and into which the one or more pipes lead. Since the pressures generated by any explosion in an apparatus according to the invention are relatively small, the container, the housing of the downstream dust separator and the connecting means need be explosion-resistant, i.e. resistant to explosion pressure surges or—if desired—resistant to explosion pressure, only to relatively small pressures. Consequently, the production costs of the apparatus can be kept appropriately low. In many cases, it may be sufficient to make the container, the connecting means and the housing resistant to explosion pressure surges or resistant to explosion pressure to a pressure which is 100 kPa to 500 kPa and, for example, 150 kPa to 300 kPa greater than the air pressure in the environment.

If dust passes through the first filter and is separated off at the second filter, dust adhering to the second filter may form a layer in which the dust concentration is substantially higher than the density of the dust suspended in the gas which flows from the first to the second filter. However, the dust separated off by the second filter usually does not permit an explosion to occur as long as it adheres to the filter.

It may be possible to provide a means for freeing the second filter or parts thereof intermittently from adhering dust while gas flows through the container and from the first to the second filter.

BRIEF DESCRIPTION OF THE DRAWINGS

The subject of the invention is illustrated in more detail below with reference to apparatuses shown in the drawings. In the drawings.

DESCRIPTION OF THE PREFERRED EMBODIMENTS

Figure 1:
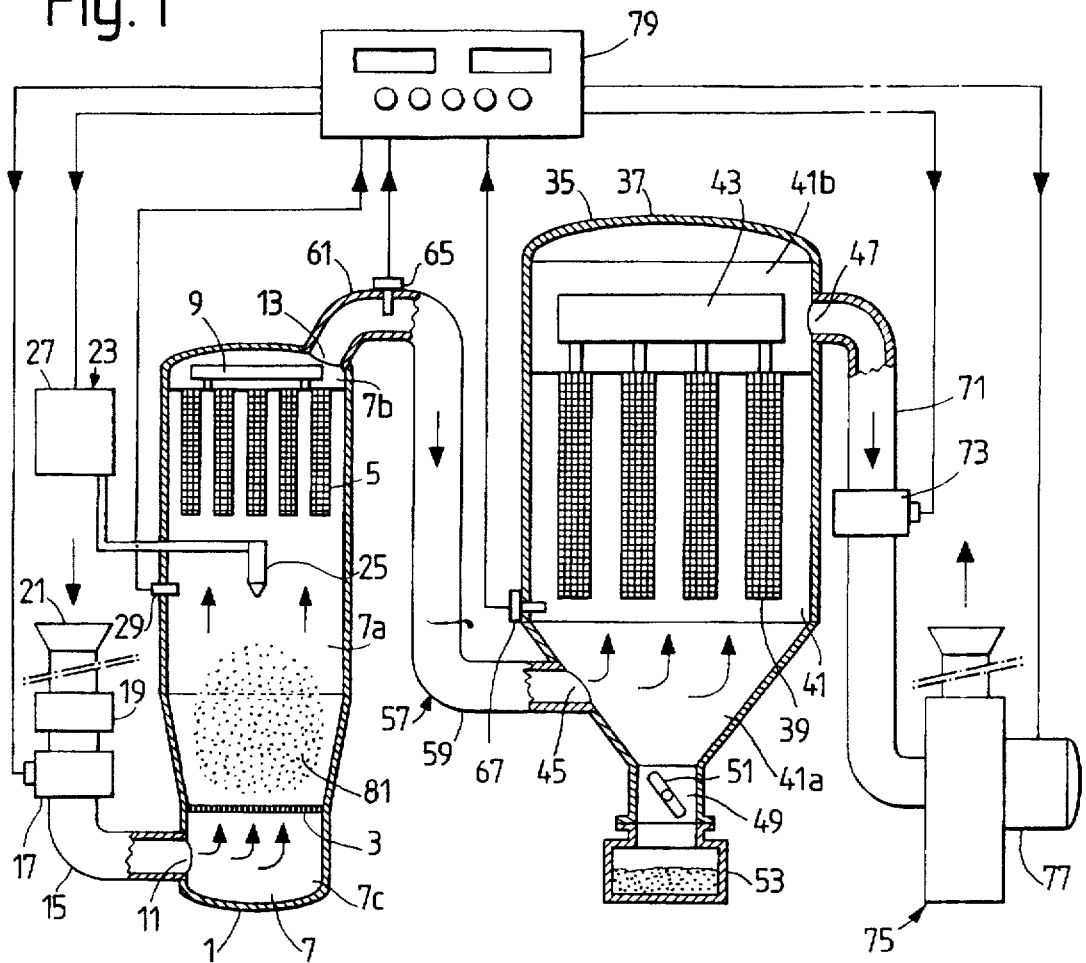
FIG. 1 shows an apparatus drawn schematically, partly in section and partly as a view, and having a material and/or fluidized bed container possessing a perforated base.

The apparatus shown in FIG. 1 and serving for moving—namely fluidizing—and treating a particulate material has a material and/or fluidized bed container 1 which is in general rotationally symmetrical with respect to a vertical axis. A gas-permeable perforated base 3 is arranged in the lower part of the container 1. A first filter 5 is arranged in the upper part of the container 1. Although the container 1 is shown schematically with a continuous wall, it consists in reality of a plurality of detachably connected parts, so that the perforated base and the first filter 5 can be removed from the container 1 with relatively little work. The container bounds an interior space 7 which is sealed all round from the environment. This interior space has a first, lower interior region 7a present between the perforated base 3 and the first filter and a second, upper interior region 7b present between the upper end of the container wall and the filter 5. Furthermore, a gas distribution interior region 7c is present between the lower end of the wall and the perforated base.

The first filter 5 has a holder and a filter fabric which is held by said holder and has tufts. A vibratory device 9 which makes it possible to vibrate the first filter 5 may also be present. However, the first filter 5 may also have two or possibly more separately vibratable filter parts, each of which has a holder part and a filter fabric held by said holder part.

The container 1 is provided, in the vicinity of its lower end, with a gas inlet 11 which leads into the gas distribution interior region 7c. A gas outlet 13 which leads into the second, upper interior region 7b is present at the upper end of the container.

The gas inlet is connected to a gas inlet pipe 15 which connects the gas inlet 11 via a fast-action shut-off device 17 and an inlet air filter 19 to an air inlet 21 leading into the environment.

A spray device 23 having at least one spray nozzle 25 arranged in the interior region 7a and a spray material feed device 27 connected to said nozzle may also be present.

Furthermore, at least one explosion detector 29 is present. This has, for example, a sensor projecting into the first interior region 7a, for measuring the pressure and/or for detecting a flame.

A downstream dust separator 35 has a housing 37 which in general is rotationally symmetrical with respect to a vertical axis and contains a second filter 39. This has, for example, a few filter cartridges but could also have a holder and a filter fabric which is held by said holder and has tufts. The second filter 39 has gas passages whose diameter is expediently at most equal to the diameter of the gas passages of the first filter and preferably smaller than the last-mentioned diameter. The housing 37 encloses an interior space 41 which is divided by the second filter 39 into a first, lower interior region 41a and a second, upper interior region 41b.

Furthermore, a dust-separating device 43 may be present in order from time to time to free alternately filter parts belonging to the second filter 39 or the entire second filter simultaneously from the dust adhering thereto. The dust-separating device 43 may be formed, for example, in order to vibrate the stated filter parts of the second filter or the entire second filter in order to blow away the dust from the filter parts or from the entire filter with compressed air.

The housing 37 has a gas inlet 45 leading into the first interior region 41a and a gas inlet 47 leading into the second interior region 41b. A dust outlet 49 which can be closed with a closure member 51 is present at the lower end of the housing 37. A dust collector 53 is detachably fastened to the housing 37 at the lower end of the dust outlet 41.

The gas outlet 13 of the container 1 is connected to the gas inlet 45 of the downstream dust separator 35 by connecting means 57 which have a pipeline 59 and, for example, also sockets and the like, which are not shown. The connecting means 57 bound a passage and/or connecting means interior region 61 which connects the second interior region 7b of the container 1 to the first interior region 41a of the downstream dust separator 35.

The apparatus has at least one dust concentration sensor in order to measure the dust concentration of the gas flowing during operation from the first filter 9 to the second filter 39. The apparatus may have, for example, a dust concentration sensor 65 arranged in the passage and/or connecting means interior region 61 and a dust concentration sensor 67 arranged in the first interior region 41a of the downstream dust separator 35. Each sensor 65, 67 may have, for example, optoelectronic members—namely a light emitting diode and a photodiode—in order to measure the attenuation of light which passes through the dust-containing gas. Each sensor 65, 67 may furthermore have electronic circuit means or be connected to electronic circuit means which can determine the dust concentration from the light attenuation.

The gas outlet 47 of the downstream dust separator 35 is connected by a pipeline 71 and a fast-action shut-off device 73 to the inlet of a fan 75. This has a flywheel and a drive device 77 which serves for its operation and has an electric motor. The outlet of the fan 75 leads via an exhaust air pipe or directly into the environment.

The two fast-action shut-off devices 17 and 73 have, for example, a slide valve or possibly a valve, a pneumatic regulating device for operating the slide valve or valve and an electrically controllable control valve by means of which the regulating device is connected to a compressed air source.

A control device 79 which is connected by electric cables and/or pneumatic line to the fast-action shut-off devices 17 and 73, the spray device 23, the explosion detector 29, the dust concentration sensors 65, 67 and the drive device 77 is also present. The control device 79 has electrical, electronic and possibly pneumatic circuit means, manually operable control members, display devices and the like. The control device also has in particular at least one control member for setting a switch-off limit for dust concentration. The control device furthermore has electronic circuit means for switching off the drive device 77 of the fan 75 if the dust concentration measured by one of the dust concentration sensors 65, 67 is at least equal to the set switch-off limit.

In order to use the apparatus, a batch of a particulate material 81, which consists, for example, of useful dust particles, can be introduced into the first, lower interior region 7a of the container 1 and the latter tightly closed. Thereafter, the fan 75 can be switched on by means of the control device 79, so that said fan sucks gas, i.e. air from the environment, through the gas inlet line 15, the container 1, the connecting means 57 and the downstream dust separator 35 and delivers it back into the environment. The air thus flows into the container 1 upward, from below, through the perforated base 3 and the first, lower interior region 7a, the particulate material being fluidized.

If it is merely intended to dry the particulate material, the spray device 23 is not used during fluidization of the material. If the particles of the material are to be granulated or provided with coats, a liquid and/or a particulate spray material can be atomized with the spray device 23 in the first interior region 7a and sprayed onto the particles of the material. The particles can then be dried. It should be ensured that the spray material is either nonflammable or limited in amount so that it is certain that no explosive mixture of spray material and air can form.

The air flows from the first interior region 7a through the first filter 5 into the second, upper interior region 7b. If the first filter 5 is not damaged, it separates off the dust present in the air completely or at least virtually completely. The air then flows through the connecting means 57 into the first interior region 41a of the downstream dust separator 35 and from there into the second interior region 41b of the downstream dust separator 35. The second filter 39 in any case separates dust still present in the air from the air. The now virtually completely dust-free air then passes through the pipe 71 via the fan 75 into the environment again.

If necessary, the dust-separating device 43 can from time to time free different filter parts of the second filter 35 alternately or the entire second filter 35 simultaneously from adhering dust by vibration or blowing out, while air flows through the container 1 and the downstream dust separator 35. The dust removed from the second filter can then pass through the first interior region and the dust outlet 49 into the dust collector 53. The removal of dust from the second filter should preferably be carried out in such a way that the dust concentration in the air flowing through the downstream dust separator remains below the set limit in spite of the dust dropping from the filter.

The dust concentration sensors 65, 67 continuously measure, during operation of the apparatus, the dust concentration of the dust which is present in the air flowing from the first filter to the second filter. If the dust concentration reaches or exceeds the set switch-off limit, for example owing to a tear in the first filter 5, the control device 79 switches off the exhaust air fan 75. If the spray device 23 is in operation at this time, it is also switched off via the control device 79.

If an explosion is triggered at any time in the first interior region 7a of the container 1 during operation of the apparatus, the dust concentration in the gas flowing from the first to the second filter is thus lower than the predetermined dust concentration limit, before and during triggering of the explosion. As discussed in the introduction, the explosion then generates pressures which are substantially smaller than when the dust concentration in the gas flowing from the first to the second filter exceeds the low explosion limit during triggering.

If an explosion takes place, it is detected by the explosion detector 29. The control device then closes the two fast-action shut-off devices 17 and 73 so that only a small amount of particulate material or dust, but certainly no flame, enters the environment only during the very short closing time in the ms range.

Figure 2:
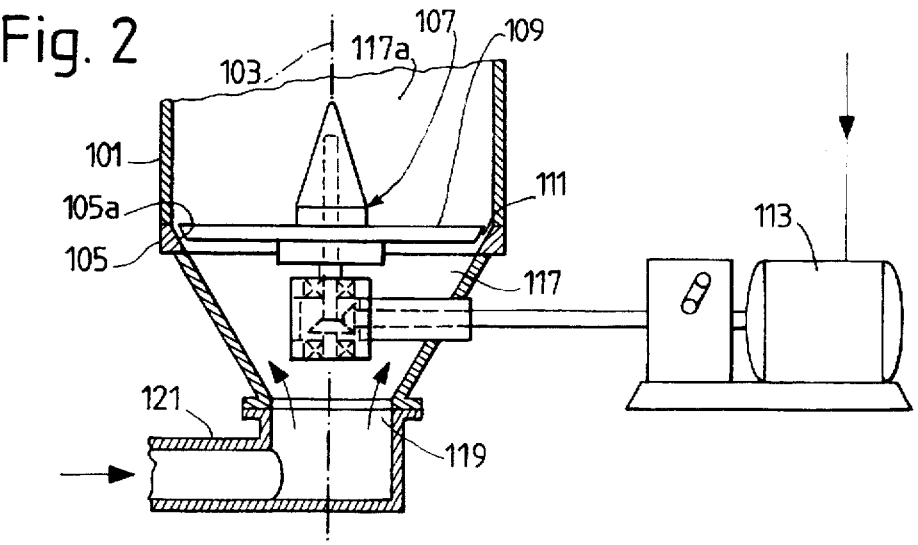
FIG. 2 shows a section through a part of a material container, which has a rotor instead of a perforated base.

The apparatus shown partly in FIG. 2 has a material container 101 with a vertical axis 103 and a ring 105. This forms an inner surface section 105a of the inner surface of the container, which section is rotationally symmetrical with respect to the axis 103. A rotor 107 which is rotatable about the axis 103, is adjustable in height and has a disc 109 is present in said container. During operation of the apparatus, the rotor is brought by means of a regulating device into a position in which, together with the inner surface section 105a, it bounds an annular gap 111. A drive device 113 which serves for turning the rotor has an electric motor which is connected by an electric cable to the control device which is not shown. The rotor 107 replaces the perforated base 3 of the apparatus shown in FIG. 1 and bounds the lower end of the first, lower interior region 117a of the interior space 117 of the container 101. This has at its lower end a gas inlet 119 to which a gas inlet pipe 121 is connected. Unless stated otherwise above, the apparatus shown in FIG. 2 may be formed similarly to the apparatus according to FIG. 1.

When the apparatus having the parts shown in FIG. 2 is in operation, the disc 109 of the rotor 107 can rest with its conical outer surface on the conical inner surface section 105a. When the apparatus is in use, a batch of a particulate material can be introduced into the first interior region 117a.

The rotor 107 is then raised to the position shown in FIG. 2 and is turned by means of the drive device 113. Furthermore, a gas—namely air—is sucked, by means of a fan corresponding to the fan 75, from below through the annular gap 111 into the first, lower interior region 117a, through this and upwards through the first filter, which is not shown, into a second, upper interior region of the container 101 and then to a downstream dust separator and through the latter. The particles of the material present in the first interior region 117a are temporarily present on the disc 109 of the revolving rotor 107 and are moved outward away from the axis 103 by the rotor 107. When the particles reach the vicinity of the annular gap 107, they are raised up by the air and more or less fluidized and then fall back onto the disc of the rotor. During this movement, the particles of the material may, for example, be dried or, for example, first sprayed with a liquid spray material by means of a spray device not shown and then dried. Instead, the particles of the material can, for example, be sprayed simultaneously with a liquid spray material and with a dust-like spray material consisting of small solid particles and thus coated, as disclosed in EP-A-0 505 319.

During the movement and treatment of the particles, the dust concentration in the gas flowing from the first filter to the second filter is measured by means of at least one dust concentration sensor, analogously to the apparatus shown in FIG. 1. If the dust concentration is at least equal to the intended limit, the control device switches off the fan, the drive device 113 driving the rotor and—if a spray device is present and is in operation—this too.

The apparatuses and processes may also be modified in other respects. For example, one of the dust concentration sensors 65, 67 may be omitted, or a sensor arranged in the second interior region of the material container may be provided instead of this. However, it would also be possible to provide additional dust concentration sensors and, for example, to measure the dust concentration simultaneously in the first interior region 7*b* of the container 1 or 101, in the pipe 59 and in the downstream dust separator. Furthermore, the dust concentration can be measured simultaneously at different points in the downstream dust separator.

Moreover, the second interior region 7*b* of the container 1 could be divided into two chambers, each of which is coordinated with a filter part of the first filter. Each of these chambers could then have its own gas outlet. The two gas outlets could then be connected to the downstream dust separator by connecting means having two pipelines. In such a case, a dust concentration sensor could be arranged in each of these pipelines.

Furthermore, the apparatus could have parts for the formation of a closed circulation for air or possibly another gas. The outlet of the fan would then not lead into the environment but would be connected to the gas inlet of the material and/or fluidized bed container.

What is claimed is:

1. A process for moving and treating a particulate material which contains flammable dust or during the movement of which flammable dust can form, using an apparatus which includes a container, a first filter arranged therein, a downstream dust separator with a second filter, and a fan, the first filter separating in the container a first interior region from a second interior region connected to the downstream dust separator, and a spray device in said first interior region for atomizing and spraying a spray material, the process comprising introducing the material into the first interior region, passing gas by the fan through the first interior region and through the material present therein, for imparting movement of the material, and through the first filter into the second interior region and from there to the downstream dust separator and through the second filter, atomizing and spraying spray material, by the spray device, onto the material as the material is being moved within the first interior region, stopping the atomizing and spraying while continuing movement of the material within the first interior region so as to dry the material, measuring the dust concentration in gas flowing from the first filter to the second filter, and automatically switching off the fan and the spray device if the dust concentration is at least equal to a limit, said limit being lower than a critical dust concentration at which or above which a dust/gas mixture can explode.

2. A process for moving and treating a particulate material which contains flammable dust or during the movement of which flammable dust can form, using an apparatus which includes a container, a first filter arranged therein, a downstream dust separator with a second filter, and a fan, the first filter separating in the container a first interior region from a second interior region connected to the downstream dust separator, the process comprising introducing said material into the first interior region, passing gas by the fan through the first interior region and through the material present therein, for imparting movement to said material, and through the first filter into the second interior region, and from there to the downstream dust separator and through the second filter, wherein the material is dried at least during a part of the time of its movement within said first interior region, measuring the dust concentration in gas flowing from the first filter to the second filter, and automatically switching off the fan if the dust concentration is at least equal to a limit, said limit being lower than a critical dust concentration at which or above which a dust/gas mixture can explode.

3. A process as claimed in claim 2, wherein the stated limit of the dust concentration is, for example, at most 30 $g/m^3$.

4. A process as claimed in claim 2, wherein, during passage of gas through the container, freeing one of said second filter and parts thereof from any adhering dust in such a way that the concentration of dust which is suspended in gas flowing to the second filter during said freeing of the second filter from dust is lower than the limit of the dust concentration.

5. An apparatus for moving and treating, in particular fluidizing, a particulate material, in particular a material which contains flammable dust or during the movement of which flammable dust can form, including a container, a first filter within said container for separating a first interior region of the container, which first region receives the material, from a second interior region of the container, a downstream dust separator connected to said second interior region and including a second filter, a fan, and a control device for controlling said fan, said fan transporting gas through the first interior region, for imparting movement of any material therein, and through the first filter into the second interior region, and from there to the downstream dust separator and through the second filter, wherein material may be dried at least during a part of the time of its movement within said first interior region, at least one dust concentration sensor for measuring the dust concentration in the gas flowing from the first filter to the second filter said at least one dust concentration sensor connected to said control device, said control device including means for switching off the fan if the measured dust concentration is at least equal to a limit, said limit being lower than a critical dust concentration at which or above which a dust/gas mixture can explode.

6. An apparatus as claimed in claim 5, wherein the dust concentration sensor has optoelectronic members for determining the attenuation of light which passes through dust-containing gas.

7. An apparatus as claimed in claim 5, further comprising at least one spray device, controllable by said control device, for atomizing a spray material in said first interior region and for spraying the spray material onto material present within said first interior region, and wherein said control device switches off the spray device if the dust concentration is at least equal to said limit.

8. An apparatus as claimed in claim 5, wherein the container has an annular inner surface section rotationally symmetrical with respect to a vertical axis, wherein a rotor which is rotatable about the axis, bounds the first interior region at its lower end and, at least during operation, together with the annular inner surface section, bounds an annular gap through which gas can flow into the first interior region is present in the container, wherein the rotor can be rotated under control by the control device and wherein the control device is formed in order also to switch off the rotor if the dust concentration is at least equal to the limit.

9. An apparatus as claimed in claim 5, wherein the downstream dust separator has a housing which contains the second filter and an interior region adjacent to said filter and wherein connecting means are present and connect the second interior region of the container to the stated interior region of the downstream dust separator and the container, the connecting means and the housing of the downstream dust separator are resistant to explosion pressure surges or resistant to explosion pressure to a pressure which is 100 kPa to 500 kPa greater than the air pressure in the environment.

10. An apparatus as claimed in claim 5, wherein the downstream dust separator has a housing which contains the second filter and an interior region adjacent to said filter and wherein connecting means are present and connect the second interior region of the container to the stated interior region of the downstream dust separator and the container, the connecting means and the housing of the downstream dust separator are resistant to explosion pressure surges or resistant to explosion pressure to a pressure which is 180 kPa to 300 kPa greater than the air pressure in the environment.

* * * * *